United States Patent

[11] 3,619,809

[72] Inventors Peter S. Ozzimo
　　　　　　　Hawthorne;
　　　　　　　William F. Stokes, Jr., Buena Park; Donald
　　　　　　　R. Dewhirst, Compton, all of Calif.
[21] Appl. No. 54,139
[22] Filed July 13, 1970
[45] Patented Nov. 9, 1971
[73] Assignee Hughes Aircraft Company
　　　　　　　Culver City, Calif.

[54] SEALING ARRANGEMENT FOR LASER COOLING SYSTEM
　　　5 Claims, 1 Drawing Fig.
[52] U.S. Cl. .................................................. 331/94.5
[51] Int. Cl. .................................................. H01s 3/04,
　　　　　　　　　　　　　　　　　　　　　　　H01s 3/02
[50] Field of Search .................................... 331/94.5

[56] References Cited
UNITED STATES PATENTS
3,361,989　1/1968　Sirons ........................ 331/94.5

OTHER REFERENCES
Hardaway, " Why Lasers Fail-And What To Do About It," Microwaves, Apr., 1966, pp. 46–54.

Primary Examiner—Ronald L. Wibert
Assistant Examiner—R. J. Webster
Attorneys—James K. Haskell and Paul M. Coble ABSTRACT: A laser cooling system is disclosed wherein high-pressure coolant gas is circulated past a rod of laser material, and a readily removable arrangement is provided for sealing the ends of the rod to the device housing in a manner preventing the emitter laser radiation from passing through the coolant gas. The ends of the laser rod are supported in tubes extending inwardly from opposite walls of the housing, and O-rings are used to seal the rod to the tubes. Chromium bands disposed on the lateral surface of the rod adjacent the O-rings protect the O-rings from damage by scattered radiation.

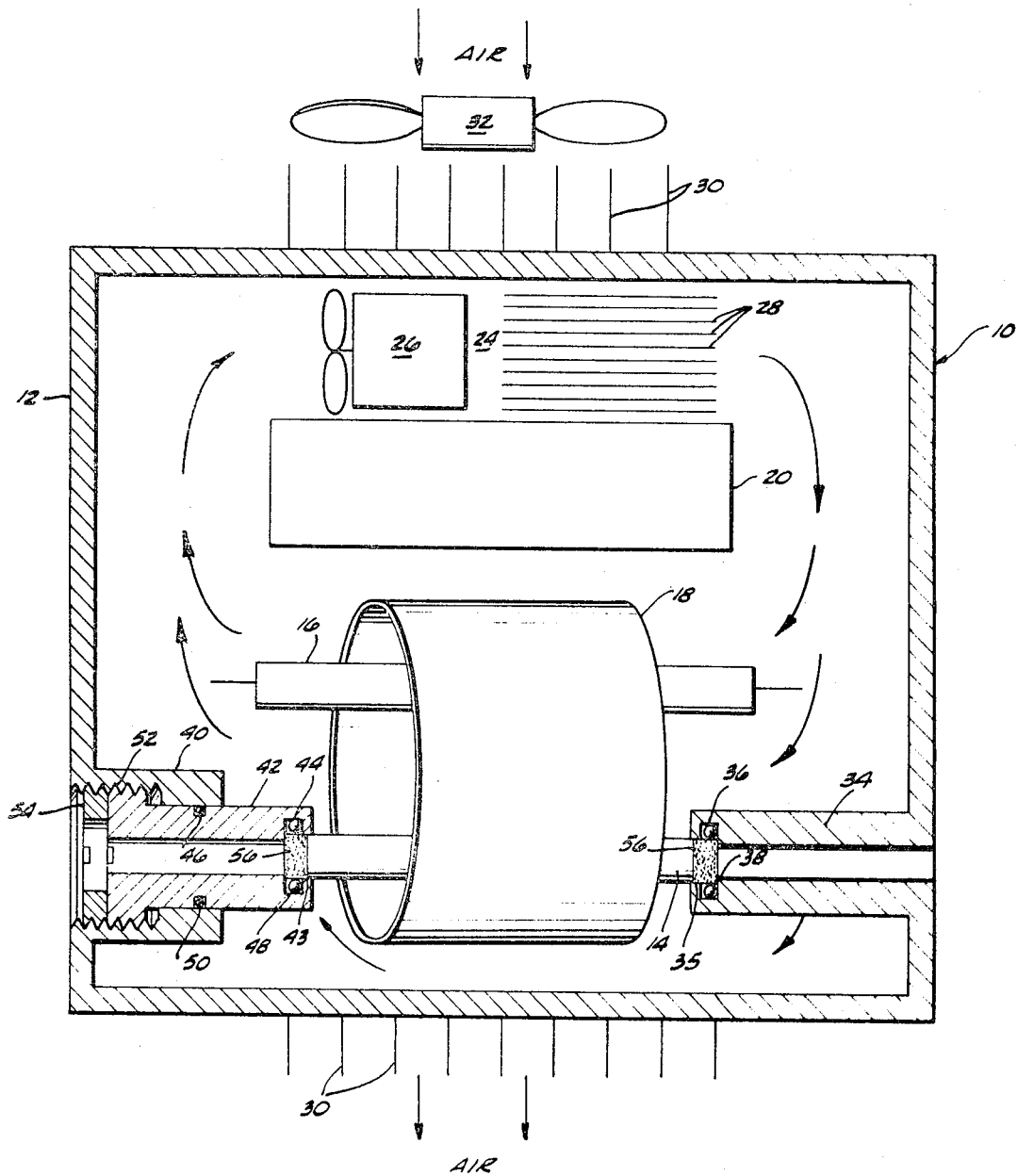

SEALING ARRANGEMENT FOR LASER COOLING SYSTEM

This invention relates to lasers, and more particularly relates to an improved laser cooling system utilizing a high-pressure coolant gas.

Laser cooling systems have been developed in which a high-pressure gas, such as nitrogen pressurized to around 300 pounds per square inch, are circulated past the laser material. In a system of this type, disclosed in U.S. Pat. No. 3,487,328 to L. Katz, both the laser rod and the pumping lamp are completely immersed in the circulating pressurized gas. In such a system the emitted laser light passes through the circulating gas, and movement of the gas produces sufficient turbulence to interfere with the lasing of the device and significantly reduce its efficiency of operation. Thus, a way had to be found for circulating high-pressure coolant gas past a body of laser material without permitting the gas turbulence to degrade the laser operation.

One solution to this turbulence problem is to design the coolant flow path so that the emitted laser light does not pass through the circulating coolant gas, for example, by sealing the device housing to the ends of the laser rod. Moreover, in order to permit access to the interior of the housing so as to remove or replace the laser rod when necessary, a readily removable sealing arrangement is desirable. Both of these criteria may be fulfilled by mounting removable tubes on the ends of the laser rod and sealing these tubes to the laser rod and to the housing by means of O-rings.

A problem encountered in such an O-ring sealing arrangement was that radiation from the laser pumping flash lamp and scattered by the laser rod attacked the O-ring material, resulting in the eventual destruction of the seal. Attempts were made to coat the ends of the laser rod with an opaque material in order to prevent the scattered radiation from reaching the O-ring. Numerous materials including gold paint as well as metals such as silver, copper, lead-tin solder alloys, etc. were tested. However, with all of these materials either the adherence between the material and the rod was so weak that the material would readily rub off of the rod, or the material itself would be attacked by the scattered radiation sufficiently to impair its opaqueness. The problem of providing a readily removable seal between the ends of the laser rod and the device housing while at the same time protecting the sealing material from radiation damage seemed difficult indeed, and it was not until the advent of the present invention that the problem was truly solved.

Accordingly, it is an object of the invention to provide in a laser cooling system wherein high-pressure coolant gas is circulated past a rod of laser material, a readily removable arrangement for sealing the ends of the laser rod to the device housing in a manner preventing the emitted laser radiation from passing through the coolant gas, while at the same time ensuring that the sealing material is fully protected from damage by scattered radiation.

An arrangement according to the invention includes first and second seating devices disposed adjacent opposite walls of the device housing for holding the respective ends of the laser rod. Each seating device defines an annular groove surrounding an end portion of the lateral surface of the rod. A band of chromium is disposed on each portion of the lateral surface of the rod adjacent one of the grooves. An O-ring of resilient material is disposed in each groove for hermetically sealing the first and second seating devices to the rod. The chromium bands protect the O-rings from damage due to scattered radiation.

Additional objects, advantages and characteristic features of the invention will become apparent from the following detailed description of a preferred embodiment of the invention when considered in conjunction with the accompanying drawing in which the sole FIGURE is a schematic illustration, partly in longitudinal cross section, of a laser cooling system according to the invention.

Referring to the FIGURE with greater particularity, a laser-cooler module 10 is shown having a generally rectangular housing 12 which is preferably of a metal of good heat conductivity such as aluminum. Mounted within the lower portion of the housing 12 is a rod 14 of laser material. The rod 14 may be of Nd:YAG, ruby or any other solid state laser material. A flash lamp 16 is disposed in lateral proximity to the laser rod 14 to enable pumping of the rod 14 to a lasing state. A tubular shield 18 of highly reflective material such as gold-plated aluminum is disposed around the laser rod 14 and flash lamp 16 so as to concentrate pumping radiation from the lamp 16 onto the laser rod 14. It is pointed out that although a laser amplifier is shown, operation as a laser oscillator may be achieved by mounting suitable reflectors at opposite ends of the rod 14.

In order to remove heat generated by the laser rod 14 and flash lamp 16, an arrangement is provided for circulating a high-pressure coolant gas past the laser rod 14 and flash lamp 16. An example of a particular coolant gas which may be employed is nitrogen pressurized to around 300 pounds per square inch, although other gases such as helium or argon are also suitable. A wall member 20 is disposed within the housing 12 so as to define a coolant flow path from heat exchange region 24 past the laser rod 14 and flash lamp 16 and back to the heat exchange region 24. The high-pressure coolant gas is circulated past the laser rod 14 and flash lamp 16 by means of an impeller-type pump 26. Heat removed from the rod 14 and flash lamp 16 and carried by the coolant to the heat exchange region 24 is transferred to a plurality of heat exchange fins 28 which project inwardly from a wall of housing 12 into the heat exchange region 24. The fins 28 conduct heat through the housing walls to a plurality of external fins 30 which project outwardly from both the upper and lower walls of the housing 12. The external fins 30 in turn transfer heat by convection to an ambient coolant such as air which is driven past the fins 30 by means of a blower or fan 32.

As was mentioned above, in order to prevent turbulence of the circulating high-pressure coolant gas from adversely affecting the laser action, the ends of the laser rod 14 are sealed to the housing 12 in a manner preventing the emitted laser radiation from passing through the coolant gas. In the particular arrangement shown in the FIGURE, one end of the laser rod 14 is sealed directly to a portion of the housing 12, while the other end of the rod 14 is sealed to the housing 12 via an intermediate removable tube so as to permit access to the interior of the housing when it is necessary to remove or replace the rod 14. It is pointed out, however, that a removable tube arrangement could be provided at each end of the rod 14.

As shown, the housing 12 is provided with a tubular extension 34 which projects inwardly from the housing 12 in the region adapted to contain the laser rod 14. The inner end region 35 of extension 34 has an inner diameter slightly greater than the diameter of the rod 14 so as to provide a seat for the adjacent end of the rod 14. The remainder of the extension 34 has an inner diameter slightly less than that of the rod 14 so as to limit longitudinal movement of the rod 14 within the extension 34. The extension 34 further defines an annular groove 36 on its inner lateral surface near the inner longitudinal extremity of extension 34. The groove 36 retains an O-ring 38 of resilient material, such as butyl rubber for example, which forms a hermetic seal between the housing extension 34 and the outer lateral surface of the adjacent end of the rod 14. It is pointed out what when the laser rod 14 is sufficiently long, the tubular extension 34 may not be necessary, and the end of the rod 14 may be seated directly in an annular indentation in the wall of housing 12.

Projecting inwardly from the wall of housing 12 opposite to the wall from which the extension 34 projects and coaxially aligned with extension 34 is a tubular extension 40. An intermediate removable tube 42 is adapted for insertion within the tubular extension 40 so as to hold the adjacent end of the laser rod 14 as well as form a hermetic seal between the rod 14 and the extension 40. The inner end region 43 of tube 42 has an inner diameter slightly greater than the diameter of the rod 14 in order to provide a seat for the end of the rod 14, while the remainder of tube 42 has an inner diameter slightly less than that of the rod 14 to limit longitudinal movement of the rod 14 within the tube 42 after the rod 14 and the tube 42 have been located in their desired assembled positions.

The tube 42 defines an annular groove 44 on its inner lateral surface near the inner longitudinal extremity of the tube 42 and further defines an annular groove 46 in the longitudinally middle portion of its outer lateral surface. The groove 44 retains an O-ring 48 of resilient material which hermetically seals the rod 14 to the tube 42, while the groove 46 retains a resilient O-ring 50 which forms a hermetic seal between tube 42 and the housing extension 40. A portion of the inner lateral surface of extension 40 and a portion of the outer lateral surface of tube 42 may be provided with complementary threads 52 so that the tube 42 may be screwed into the extension 40. A locking nut 54 may be screwed into the extension 40 in abutting relationship with the outer end of the tube 40 so as to firmly retain the laser rod 14 in its desired mounted position within the ends of tubular extension 34 and tube 42.

In order to protect the O-rings 36 and 44 from damage due to radiation from the flash lamp 16 which is scattered radially outwardly by the laser rod 14, the outer lateral surface of each end of the rod is covered with a band 56 of chromium. Each chromium band 56 extends lengthwise along the rod 14 from the associated end of the rod to a distance greater than the width of the groove 36 or 44. Preferably, the chromium layers 56 are formed by the vapor deposition of chromium to a thickness sufficient to ensure at least 99 percent opaqueness through the deposited chromium.

Chromium has been found to be unique among the materials which have been tried in attempts to protect the O-rings from scattered radiation. Not only is chromium itself highly resistant to radiation damage, but in addition chromium has excellent adherence to the rod surface so as to ensure permanent retention of the bands 56 on the rod 14. Thus, the present invention enables the achievement of a readily removable hermetic seal between the ends of the rod 14 and the housing 12, while at the same time ensuring that the sealing material is fully protected from damage by scattered radiation.

Although the present invention has been shown and described with reference to a particular embodiment, nevertheless, various changes and modifications obvious to a person skilled in the art to which the invention pertains are deemed to lie within the purview of the invention.

What is claimed is:

1. In a laser cooling system wherein a pressurized coolant gas is circulated past a rod of laser material mounted in the system housing, an arrangement for hermetically sealing the rod to the housing comprising:

first and second seating means disposed adjacent opposite walls of said housing for holding the respective ends of said rod, each of said first and second seating means defining an annular groove surrounding an end portion of the lateral surface of said rod, a band of chromium disposed on each portion of the lateral surface of said rod adjacent one of said grooves, and an O-ring of resilient material disposed in each of said grooves for hermetically sealing said first and second seating means to said rod.

2. An arrangement according to claim 1 wherein each chromium band has a thickness insuring at least 99 percent opaqueness therethrough.

3. An arrangement according to claim 1 wherein at least one of said first and second seating means includes a tubular extension projecting inwardly from a wall of said housing and a tubular member removably disposed within said tubular extension, the inner lateral surface of said tubular member defining the said annular groove adjacent an end portion of the lateral surface of said rod, one of said O-rings being disposed in the said annular groove for sealing said rod to said tubular member, said tubular member further defining another annular groove on its outer lateral surface adjacent a portion of the inner lateral surface of the said tubular extension, and another O-ring of resilient material disposed in said another annular groove for hermetically sealing said tubular member to said tubular extension.

4. An arrangement according to claim 3 wherein a portion of the inner lateral surface of said tubular extension and a portion of the outer lateral surface of said tubular member define complementary treads.

5. An arrangement according to claim 4 and further including a locking nut for insertion within said tubular extension in abutting relationship with the outer end of said tubular member.

* * * * *